United States Patent [19]
Dederer et al.

[11] 3,847,470
[45] Nov. 12, 1974

[54] INDIRECT BINOCULAR OPHTHALMOSCOPE

[75] Inventors: Roland Dederer, Sinsheim; Erwin Jahns, Heidelberg; Herbert Maier, St. Ilgen; Joachim Moser, Sinsheim; Karl-Heinz Vierling, Bammental, all of Germany

[73] Assignee: Eltro GmbH & Co., Heidelberg, Germany

[22] Filed: Jan. 12, 1973

[21] Appl. No.: 322,973

[30] Foreign Application Priority Data
Jan. 19, 1972  Germany............................ 7201864
Jan. 19, 1972  Germany............................ 7201865

[52] U.S. Cl.......................... 351/6, 350/145, 351/9
[51] Int. Cl........................ A61b 3/12, G02b 27/02
[58] Field of Search........... 351/6, 9, 12, 13, 14, 16, 351/31; 350/145, 146

[56] References Cited
UNITED STATES PATENTS

| | | | |
|---|---|---|---|
| 2,757,574 | 8/1956 | Thorburn............................ | 351/6 X |
| 3,018,686 | 1/1962 | Kurz.................................... | 351/31 |
| 3,035,483 | 5/1962 | Andreas et al....................... | 351/12 |
| 3,582,191 | 6/1971 | Cohen................................. | 351/6 X |
| 3,586,424 | 6/1971 | Schenk et al. ..................... | 351/9 |

*Primary Examiner*—Paul A. Sacher
*Attorney, Agent, or Firm*—Waters, Roditi, Schwartz & Nissen

[57] ABSTRACT

An indirect binocular ophthalmoscope including a single prism and a lens system connected to an illuminating arrangement fastened thereto and extending at an angle therefrom; the illuminating arrangement including a light source, and a motor-driven cooling air ventilator located in a single lamp housing.

8 Claims, 5 Drawing Figures

INDIRECT BINOCULAR OPHTHALMOSCOPE

FIELD OF THE INVENTION

The present invention relates to an ophthalmoscope and, more particularly, to an indirect binocular ophthalmoscope having a combined illuminated optical viewing system and illuminating arrangement therefore.

DISCUSSION OF THE PRIOR ART

An ophthalmoscope is presently known in the art, for example, as disclosed in German published Patent application 1,949,236, in which a lamp for illuminating an object to be examined, as well as a prism system utilized for observation thereof, are fixedly interconnected with each other. The illuminating beam emanating from a lamp housing containing the light source coincides with the optical axis of the path of an optical viewing or observation beam. The prism system may also be binocularly formed so as to provide for stereoscopic observation.

Furthermore, there is also presently known, from the disclosure of German Petty Patent 6,608,242, an ophthalmoscope having a mono-ocular observation system adapted to be separated from the lamp housing. The lamp housing contains, interiorly thereof, a suitable halogen glow lamp, and furthermore includes suitable slots extending through the walls of the housing which facilitate the ready exchange of cooling air for the lamp.

Both of the above-mentioned prior art constructions are subject to numerous drawbacks and limitations. Thus, during examination the physician or ophthomoligist, for whom the ophthalmoscope is the most frequently utilized instrument, as well as the patients being examined therewith, have their faces subjected to uncomfortable amounts of heat generated and radiated by the light source within the lamp housing. Additionally, the usual requirement for a plurality of prisms makes the instrument more expensive to manufacture, and renders its manipulation relatively unwieldy.

SUMMARY OF THE INVENTION

The present invention obviates the disadvantages and drawbacks encountered in prior art ophthalmoscope constructions, by providing a novel and advantageous indirect binocular ophthalmoscope which is of relatively simple construction, may be readily manipulated, and during utilization thereof does not cause disturbing side effects, while being of essentially compact construction, and of relatively low manufacturing cost.

In a preferred embodiment of the ophthalmoscope, the latter is provided with a lamp housing having facilities for the inlet of cooling air which, subsequent to its warming by the light source in the housing, may be conveyed downwardly and blown outwardly in an advantageous and simple manner. In view of the foregoing inventive measures the lamp housing and ophthalmoscope is adapted to employ light sources having greater illuminating intensities. In particular, presently known halogen glow lamps are well suited for use in connection with the inventive ophthalmoscope inasmuch as their relatively small cross-sectional diameters permit the flow through the housing of a broad cooling air stream. Furthermore, the ophthalmoscope according to the invention provides for a pair of reflecting mirrors by means of which illuminating rays which are reflected back by the object or patient being examined are conducted into the eyes of the physician through two closure discs or correction glass plates providing for matching of the refractive anomalies of the patient's as well as of the physicians eyes. The distance between the two reflecting mirrors, as well as that of the closure or correction plates is adjustable so as to be correlated with and positioned at the pupillary distance of the physician. Moreover, additional planar surfaces provided on an illuminating beam-dividing prism permits the conveyance of the optical viewing and of the illuminating beam paths across one and the same element. In view of the foregoing, and by utilizing planar surfaces positioned in contiguous, right-angled relationship, two prisms are eliminated in comparison with prior art ophthalmoscope structures.

A further feature of the novel ophthalmoscope according to the invention lies in the provision of filters and diaphragm apertures adapted to be manually manipulated by a single finger so as to afford improved correlation with particular individual examining requirements without having to dismount or adjust the ophthalmoscope. Through a suitable electronic brightness control the desired lighting intensity may be provided, this being obtainable through a suitable control apparatus which is connected to the optical system of the ophthalmoscope. Further, electrical power may be supplied by means of a multi-wire electrical conduit separately to the light source and to a cooling air ventilator therefore. The ophthalmoscope also includes structure so as to adapt it to observation of only the background or interior of a single eye, through utilization with the lamp housing of another superimposed prism. With respect to the foregoing, this also allows for the rapid interchanging or replacement of the glow lamp in the housing.

Another feature of the advantageous construction of the ophthalmoscope according to the present invention lies in that, by imparting slight pressure against one of the two oculars, a plate which is associated therewith may be displaced in a desired direction, either toward or away from the optical viewing axis, in view of which, the plate correspondingly imparts movement to a rotatable disc through a guide pin mounted on the plate and which extends into an aperture in the disc. The disc, through the intermediary of a second guide pin, displaces a second plate associated with the other ocular so as to correspondingly displace that ocular. The inter-engaging elements are dimensioned so as to avoid automatic and inadvertent displacement thereof. For example, both plates may be positioned whereby one is located above and the other below the rotatable disc. In order to conserve space, it is advantageous that both plates be located in the same plane, in view of which they do not extend across their full width into the zone of the optical axis, but only through angled projections on which the guide pins are mounted. Both angled projections are positioned on opposite sides whereby the plates, during movement thereof, do not interfere with each other. Preferably, there also is provided a base plate having a central recess adapted to receive the rotatable disc. Two further recesses may be provided in the base plate so as to afford the required supporting or mounting space for the oculars as well as for their displacing movement.

BRIEF DESCRIPTION OF THE DRAWINGS

Reference may now be had to a detailed description of a preferred embodiment of the ophthalmoscope according to the invention, taken in conjunction with the accompanying drawings, in which.

DETAILED DESCRIPTION

Figure 1:
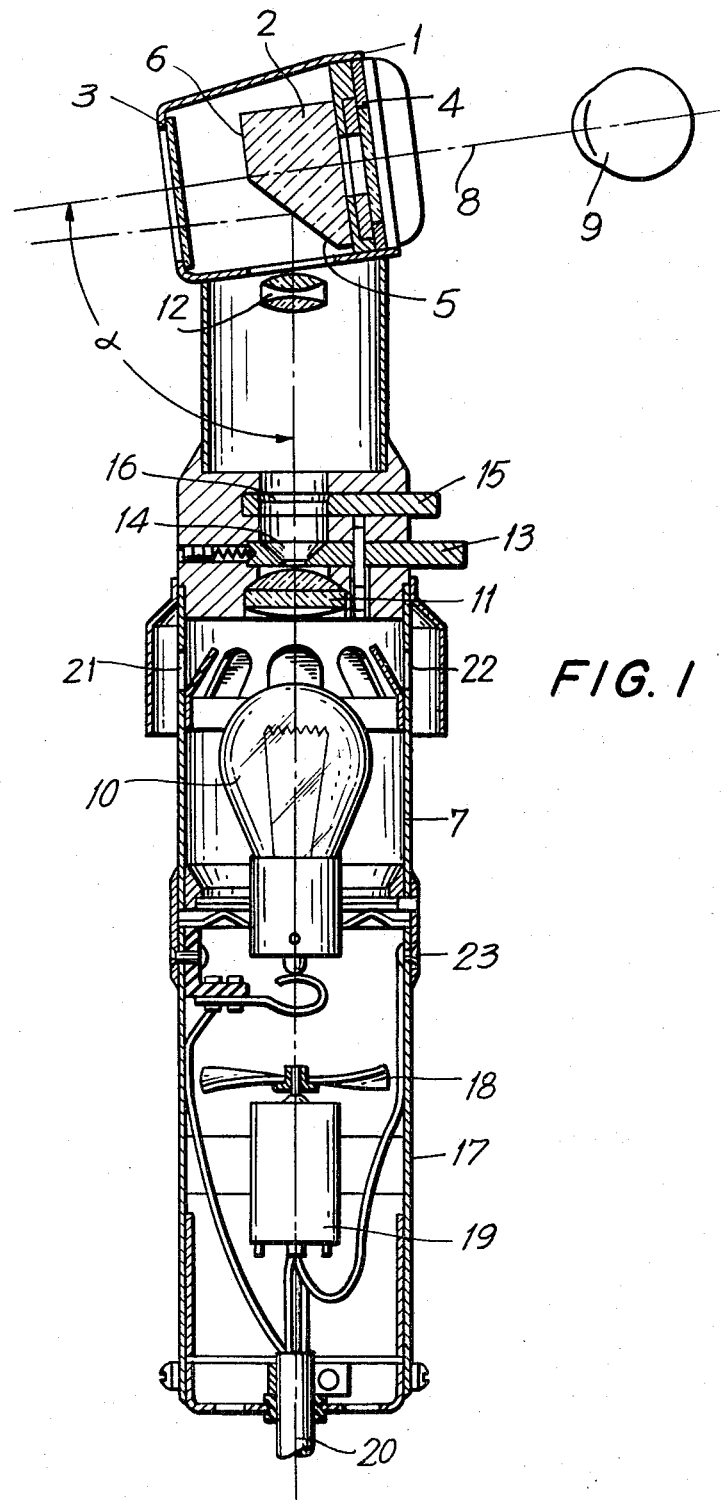
FIG. 1 is a longitudinal sectional view of an indirect binocular ophthalmoscope in accordance with the present invention.

Referring now to the drawings, and particularly FIG. 1, the ophthalmoscope of the present invention includes a housing portion 1 which encompasses a beam-dividing prism 2, as well as an end closure plate 3 and two correction glass plates 4. The prism includes two planar surfaces, which contact each other at an angle of 90°, and form an opposite edge 6, as well as an additional planar surface 5 which cuts off a portion of edge 6. A second housing portion in a form of a lamp housing 7 is attached to housing portion 1, preferably through a sleeve or socket sleeve connection, and is located relative to the other housing portion whereby the longitudinal axis of lamp housing 7 forms an acute angle α with respect to the optical viewing axis 8 of the ophthalmoscope. The eye of the physician utilizing the ophthalmoscope is designated by the reference numeral 9.

Figure 2:
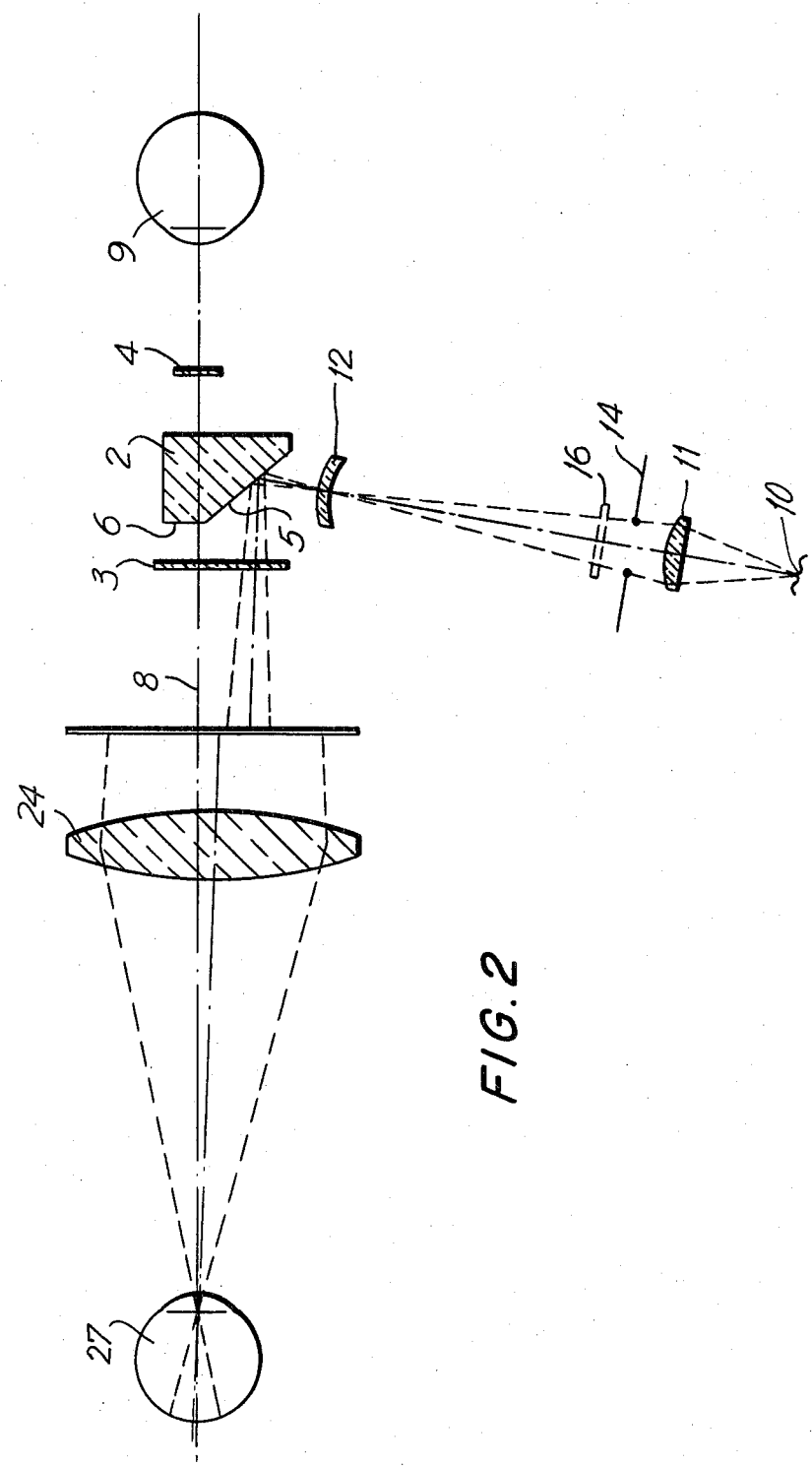
FIG. 2 is a diagrammatic side view of the optical beam path in the ophthalmoscope according to the present invention.
Figure 3:
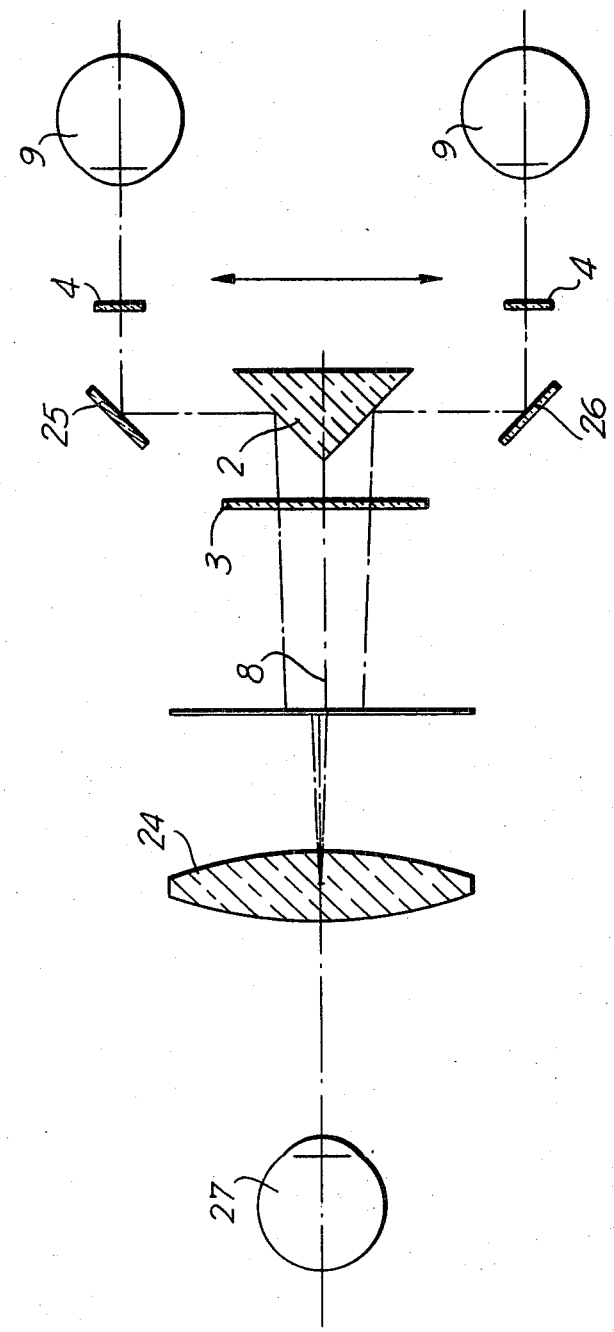
FIG. 3 is a plan view of the optical beam path as shown in FIG. 2.

The lamp housing 7 contains the required components adapted to provide for the illumination of the eye of the patient, in effect, a light source 10, as well as a lens 11 and an objective 12. The light beam emanating from the light source 10 is deflected or bent by the surface 5 of the beam-dividing prism 2 so as to project into the eye of a patient through a suitable eyepiece or magnifying lens 24 (FIGS. 2 and 3) provided for its observation. A rotatable disc 13 is interposed between lens 11 and prism 2, and supports a plurality of varied diaphragm apertures or shutters 14 adapted to be selectively positioned in the path of the optical viewing beam. A similarly constructed plate 15 mounts a number of filters 16, which may also be, as required, positioned in the path of the beam.

A hand grip portion 17 is attached to the lamp housing 7, within which there is positioned a cooling air ventilator 18 adapted to be driven by a small motor 19. The motor 19 and light source 10 are provided with the required electrical power through a multi-wire electrical conduit 20. As shown in FIG. 1 of the drawing, above the light source 10, the lamp housing 7 is provided with a row of peripherally spaced slots 21, 22, through which cooling air may be drawn interiorly of the lamp housing by the ventilator 18. The hand grip 17 may be provided in the region thereof which is attached to the lamp housing 7, with a suitable bayonet-type connection 23.

Figure 5:
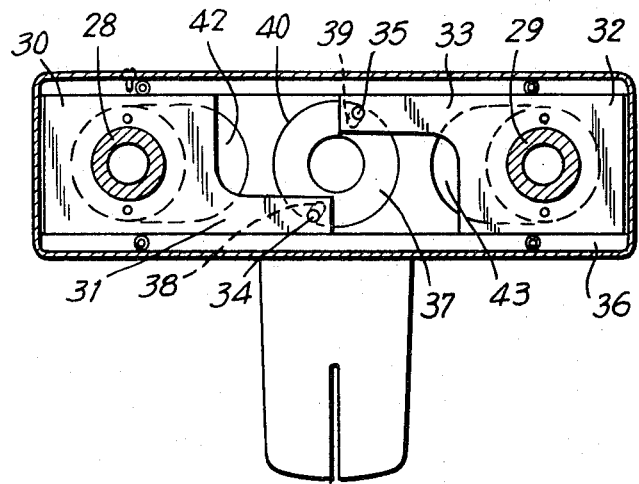
FIG. 5 is a sectional view taken along line 5—5 in FIG. 4.
Figure 4:
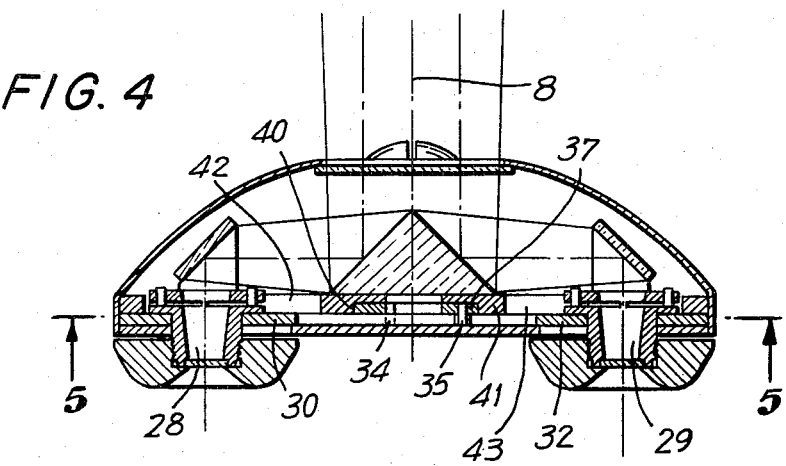
FIG. 4 is a sectional plan view of the binocular portion of the ophthalmoscope.

Suitable apertures may be provided in the bottom portion of the hand grip 17 so as to permit the exit of the warmed air drawn through the interior of the lamp housing 7 past the light source, through actuation of the ventilator 18, thereby cooling the light source 10. The beam path illustrated in FIGS. 2 and 3 of the drawings between the beam-dividing prism 2 and the magnifying lens 24 is shown in an abbreviated manner. Thus, the optical viewing beam path incorporates, in addition to magnifying lens 24 and prism 2, two reflecting mirrors 25 and 26, which reflect a beam from the eye 27 of a patient back into the eye 9 of the examining physician. A pair of correction glass plates 4 are provided in front of the reflecting mirrors, so as to compensate for the refractive anomalies of the physician's eyes. The distance between the reflecting mirrors 25 and 26, of their associated oculars 28 and 29, as shown in FIGS. 4 and 5 of the drawing, as well as that of the correcting glasses 4 is adjustable, in view of which the examining physician may adjust for the correct pupillary distance. The last corresponds namely in view of the accommodation by the user of ophthalmoscope with respect to an imaginary intermediate image formed irrespective of any remote or proximate pupillary distance.

The magnifying lens 24 which may, for example have a diopter of 16, and may be positioned at a distance of approximately 5 centimeters in front of the eye 27 of the patient. The rays emanating from the illuminated eye background or interior are joined through the magnifying lens 24 with a virtually inverted image, in respect to which image the physician must then accommodate. In view of the foregoing, the physician obtains thereby, at an excellent degree of brightness, an improved overall view across the entire retina.

In FIG. 5 there are shown two oculars 28 and 29, which may be synchronously adjusted relative to the optical viewing axis 8 (FIG. 4) of the ophthalmoscope. The ocular 28 is mounted in a plate 30 which includes an angled projection member 31 extending in a direction toward the axis 8. Similarly, a second plate 32 is provided for the ocular 29, and which has an angled projection 33 lying opposite to the angled projection 31. In each of the angled projections 31 and 33, in proximity to axis 8, there is provided a bore in which there is mounted respectively, guide pin 34 and 35. Both plates 30 and 32 are supported within a housing 36 so as to be restricted to only plane linear movement, and preferably, in a common plane.

A rotatable disc 37 which is adapted to be rotated about optical viewing axis 8 is provided with a pair of elongate slots 38 and 39, which are located in opposite diametral relationship. The guide pins 34 and 35 extend into the two elongate slots, so as to have movement imparted thereto in response to rotation of disc 37. The latter is positioned in a recess 40 formed in a base plate 41, the latter of which is also provided with two additional recesses 42 and 43. The last-mentioned recesses 42 and 43 are formed so as to be adapted to receive the oculars 28 and 29 while allowing movement thereof in a linear direction.

In order to obtain adjustment of the pupillary distance, slight pressure may be exerted against either ocular 28 or 29, by which the respective associated plate 30 or 32 may then be moved in the direction of the optical viewing axis 8. In correspondence with the movement, through either guide pin 34 or 35 this linear motion is converted into rotation of disc 37, which causes corresponding movement of the guide pin of the second plate associated therewith. Consequently, this causes the second plate to have the same movement imparted thereto as has previously been imparted to the first plate. This causes both plates 30 and 32, and concurrently therewith both oculars 28 and 29, to be displaced by an equal amount.

While there has been shown what is considered to be the preferred embodiment of the invention, it will be obvious that modifications may be made which come within the scope of the disclosure of the specification.

What we claim is:

1. An indirect manually supported and operated binocular ophthalmoscope including first and second detachably connected modular portions, and a light source in said second modular portion for projecting an illuminating beam into said first modular portion; said first modular portion comprising:

1 a housing having first and second portions; an optical viewing system positioned substantially in the first portion of said housing, said optical system including magnifying lens means positioned between said housing and a patient undergoing examination, a prism including right angle surfaces interposed in the optical axis of said optical viewing system and so positioned within said housing as to receive light reflected from the eyes of a patient undergoing examination and passing said light to a pair of reflecting mirrors, a pair of reflecting mirrors positioned within said housing for receiving reflected light from said prism, a pair of mutually adjustable plate means extending perpendicular to the axis of said optical viewing system, and a pair of oculars mounted respectively one on each of said plate means and being associated in spatially adjustable relationship with said mirrors for receiving light reflected from said mirrors and serving to pass said light into the eyes of an observer; an illuminating system being positioned in the second portion of said housing, said illuminating system including lens and shutter means for directing the illuminating beam from said light source through said second housing portion onto a reflecting surface of said prism, said prism being adapted to reflect said illuminating beam into the eye of a patient; and means on one end of said second housing portion remote from said first housing portion forming a connection to said second modular portion;

2 and said second modular portion comprising an illuminating arrangement including a generally tubular handgrip-forming housing; means on said housing cooperatively engaging said connecting means for detachably fastening said second modular portion to said first modular portion, said housing having a longitudinal axis extending at an acute angle to said optical viewing system; an apertured end closure plate being mounted on the end of said tubular housing remote from the end fastened to said first modular portion; said light source being mounted within said housing; a cooling air circulating means in said housing; and motor drive means for actuating said air circulating means positioned in said housing for drawing a flow of cooling air into said housing through the apertured casing, axially conveying said airflow along said housing past said light source, air circulating means and motor drive means, and venting the heated air from said housing through the apertures in the housing and closure plate.

2. An ophthalmoscope as claimed in claim 1, comprising rotatable plate means interposed between said light source and said prism; and a pair of filters mounted on said plate means and adapted to be selectively positioned in the path of said illuminating beam.

3. An ophthalmoscope as claimed in claim 1, comprising rotatable plate means interposed between said light source and said prism; and a plurality of diaphragm apertures on said plate means adapted to be each selectively positioned in the path of said illuminating beam.

4. An ophthalmoscope as claimed in claim 1, comprising multi-wire electrical conduit means adapted to individually supply electrical power to said light source and to said air circulating means.

5. An ophthalmoscope as claimed in claim 1, said illuminating arrangement housing comprising a socket sleeve connection with said optical viewing system; said housing having a separable housing portion forming the handgrip portion containing said light source, air circulating means, and motor drive means, said separable housing porting having bayonet-type fastening means for assembly with the other portion of said housing.

6. An ophthalmoscope as claimed in claim 1, said pair of plate means being adjustable in a plane extending perpendicular to and linearly in the direction of the optical viewing axis; each of said plates having guide pin means fastened thereon in the region of said optical viewing axis; and disc means rotatable about said optical view axis and having elongate apertures through which said guide pins extend.

7. An ophthalmoscope as claimed in claim 6, said pair of plates having angled projections on opposite sides thereof extending toward said optical viewing axis, one each of said guide pins being fastened to respectively one of said angled projections.

8. An ophthalmoscope as claimed in claim 6, comprising a support plate having a central recessed portion, said rotatable disc means being positioned in said recessed portion, said support plate having a further pair of recesses adapted to provide for adjustment of said pair of reflecting mirrors and of said oculars.

* * * * *